(12) United States Patent
Wodrich et al.

(10) Patent No.: US 6,775,117 B2
(45) Date of Patent: Aug. 10, 2004

(54) ZERO THRESHOLD SURGE SUPPRESSOR

(75) Inventors: Rudy Christian Thomas Wodrich, Etobicoke (CA); Tommy Szechin Mok, Thornhill (CA)

(73) Assignee: Square D Company, Palatine, IL (US)

( * ) Notice: Subject to any disclaimer, the term of this patent is extended or adjusted under 35 U.S.C. 154(b) by 523 days.

(21) Appl. No.: 09/752,028

(22) Filed: Dec. 29, 2000

(65) Prior Publication Data

US 2001/0055186 A1 Dec. 27, 2001

Related U.S. Application Data

(60) Provisional application No. 60/173,819, filed on Dec. 30, 1999.

(51) Int. Cl.[7] ................................................ H02H 9/00
(52) U.S. Cl. ......................... 361/56; 361/58; 361/91.1; 361/113; 361/118
(58) Field of Search .......................... 371/58, 56, 91.1, 371/118, 113

(56) References Cited

U.S. PATENT DOCUMENTS

| | | | | |
|---|---|---|---|---|
| 4,158,123 A | | 6/1979 | New ....................... | 219/121 P |
| 4,535,377 A | * | 8/1985 | Lane ............................. | 361/1 |
| 4,870,528 A | | 9/1989 | Harford ....................... | 361/56 |
| 4,870,534 A | | 9/1989 | Harford ....................... | 361/58 |
| 5,420,780 A | * | 5/1995 | Bernstein et al. ............. | 363/89 |

* cited by examiner

Primary Examiner—Stephen W. Jackson
(74) Attorney, Agent, or Firm—Larry I. Golden

(57) ABSTRACT

The present invention provides diode bridge and a parallel type, capacitor based, phase to phase surge suppressor. The suppressor acts to suppress transient energy as soon as the spike exceeds the prevailing peak of the ac waveform. The system dissipates the spike by drawing current through the system impedance between the suppressor sand the source of the surge.

15 Claims, 5 Drawing Sheets

ZERO THRESHOLD SURGE SUPPRESSOR

CROSS REFERENCE TO RELATED APPLICATION

This application takes priority from copending U.S. patent application Ser. No. 60/173,819, filed on Dec. 30, 1999.

BACKGROUND OF THE INVENTION

1. Field of the Invention

This invention relates generally to the suppression of transient energy to protect sensitive loads and more particularly to a zero threshold surge suppressor which provides a low impedance path for transient energy to flow and be dissipated.

2. Description of the Related Art

Protecting electrical and electronic equipment from ac power line disturbances is a growing concern. The industry trend has been a transformation of electrical systems from electromechanical to a sophisticated, electronic rich environment. Sensitive electronic equipment, such as programmable logic controllers, solid state motor controllers, variable frequency drives, robotics and microprocessor-based equipment have been added to boost productivity, save energy and carry out tasks more efficiently. It is clearly important to protect this proliferation of sensitive electronic equipment from the harmful effects of transients.

Voltage surge and transient suppressors are commonly employed between power sources and sensitive electrical circuitry to protect such circuitry from surges and transient spikes which can occur as a result of inductive load switching, capacitive load switching, lightening strikes or other transient events.

Utilities use capacitor banks to regulate system voltage levels as load profiles vary in an effort to minimize on-line generator capacity. As peak loads increase, additional capacitor banks become necessary for voltage support. Utilities are adding more capacitors to sub-transmission and distribution circuits to support voltage during high load periods and, in some cases, to provide power factor correction for the utility grid. Typically, utility capacitors are switched on in the morning as system load builds up and off in the evening as the load drops off.

Capacitor voltage cannot change instantaneously when system voltage is applied. As such, energizing a capacitor causes a collapse in system voltage followed by a rapid recovery and an oscillating transient. The actual magnitude of the capacitor switching at various points in the distribution system depends on several factors: 1) method of capacitor switching (i.e., oil switch, vacuum contactor, vacuum breaker, SF6 breaker), 2) presence of any transient limiting devices (i.e., inrush reactors, tuning reactors, pre-insertion resistors or inductors), 3) point in the voltage waveform at which the capacitor is first energized, 4) stiffness of the utility network (i.e., available short circuit current) and 5) presence of other capacitors on the network. With multiple capacitor banks in the system, switch-on spikes may exceed 200 percent and switch-off spikes are appreciable.

The magnitude of the transient measured at the point in the network where the capacitor is connected may be vastly different than the magnitude measured at a customer's site several miles away. Typically, the further away from the switched capacitor, the lower the magnitude of the transient as a result of the added system impedance. However, the presence of other capacitors on the network, either at low or medium voltage, may have a significant impact on the transient magnitude. Capacitors that do not employ de-tuning reactors will often magnify an otherwise benign capacitor switching transient to unacceptable levels. Utility capacitor switching transients are typically 1.3 to 1.4 per unit overvoltage range, but have been observed near the theoretical maximum of 2.0 per unit. However, if low voltage capacitors are present, transient overvoltages on the low voltage bus under some conditions may reach as high as 3.0 to 4.0 per unit with severe consequences for many types of equipment.

Sensitive loads, such as variable speed drives (i.e., 20 HP and less), commonly trip when the utility switches capacitor banks for power factor correction and/or voltage regulation. These transients can cause sensitive equipment to trip upon momentary overvoltage, resulting in loss of productivity and, in many cases, substantial losses due to scrap. The most common source of transients is utility switching of medium and high voltage capacitors for voltage regulation and power factor correction. Capacitor switching creates low frequency transients which cause sensitive loads to shut down on overvoltage fault. Prior art surge protection devices will typically limit a transient to 1.8 to 2.0 per unit overvoltage, but small drives will trip at 1.3 to 1.4 per unit overvoltage.

The traditional method of protecting variable speed drives or other sensitive loads from utility side transients has been the installation of line reactors in series with the sensitive load to increase line impedance and limit the transient at the drive terminals. Further information on series reactors may be found in U.S. Pat. No. 4,158,123, titled "Series Reactor". However, in many cases, the line reactors will only lessen the transient problem and not eliminate it. Line reactors are intended to limit inrush current and attenuate harmonics, but may not always be sufficient to eliminate transient related drive problems. Each variable frequency drive must be equipped with an input reactor. Additional disadvantages with the use of a series reactor are: 1) sufficient space is required for the reactor to be located adjacent the electrical load, 2) substantial production downtime occurs when installing the reactor, 3) the reactor dissipates extra energy and 4) the reactor does not provide for protection of other sensitive loads on the same bus.

Transient voltage surge suppression systems help to reduce or eliminate harmful transients, surges and electrical line noise, thus preventing damage to sensitive electrical equipment. Many transient voltage surge suppression systems utilize multiple parallel metal oxide varistors (MOV's). As the voltage reaches the MOV's rated voltage level, the impedance of the MOV changes state, providing a low impedance path for the transient to follow. This allows the excess energy to be diverted away from the protected load.

MOV's are voltage clamping devices usually connected directly across a power line. An MOV does not clamp until the occurrence of a voltage transient exceeds the line voltage by a sufficient amount. As the voltage transient rises, the MOV's nonlinear impedance results in a current spike through the MOV that rises faster than the voltage across it. This produces the desired voltage clamping action. However, the clamping characteristic of a MOV is too high to protect sensitive loads from the 200 percent and higher voltage spikes generated by most utility switched capacitor banks.

Another disadvantage with the use of MOV's is that when subjected to a sustained overvoltage or a large transient exceeding its capacity, the MOV can go into a "thermal avalanche" or "thermal runaway" condition where the zinc oxide material of the MOV will break down and can initiate a short circuit condition.

Because MOV characteristics are unsuitable for protecting small drives, a suppressor with a lower voltage characteristic is necessary. The zero threshold surge suppressor of the present invention is designed to reduce the voltage spike below the overvoltage trip level of the adjustable-speed motor drives. The zero threshold surge suppressor is a capacitor based, phase to phase surge suppressor wherein the suppressed spike amplitude is dependent on the time constant of the zero threshold surge suppressor resistor-capacitor circuit.

The present invention provides for suppression of low frequency transients to acceptable levels as well as transients generated by transfer switch operations with the use of a passive diode bridge and a electrolytic capacitor bank to shunt transient energy away from sensitive equipment.

The advantages of the zero threshold surge suppressor over a series reactor are: 1) the zero threshold surge suppressor can be installed without production downtime, 2) the zero threshold surge suppressor can be located out of the production area, 3) the zero threshold surge suppressor is more efficient, 4) the zero threshold surge suppressor provides for protection to all electrical loads on the bus and some measure of protection for adjacent busses, 5) the zero threshold surge suppressor is not MOV based and, therefore, it will not degrade over time as multiple transients are suppressed and 6) the zero threshold surge suppressor can typically limit capacitor switching transients to 1.2 per unit overvoltage or less, effectively protecting variable speed drives and other sensitive loads downstream of the device.

SUMMARY OF THE INVENTION

The present invention provides a parallel type, capacitor based, phase to phase surge suppressor. The suppressor acts to suppress the transient voltage as soon as the spike exceeds the prevailing peak of the ac waveform. The system dissipates the spike by drawing current through the system impedance between the suppressors and the source of the surge.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

Figure 1A:
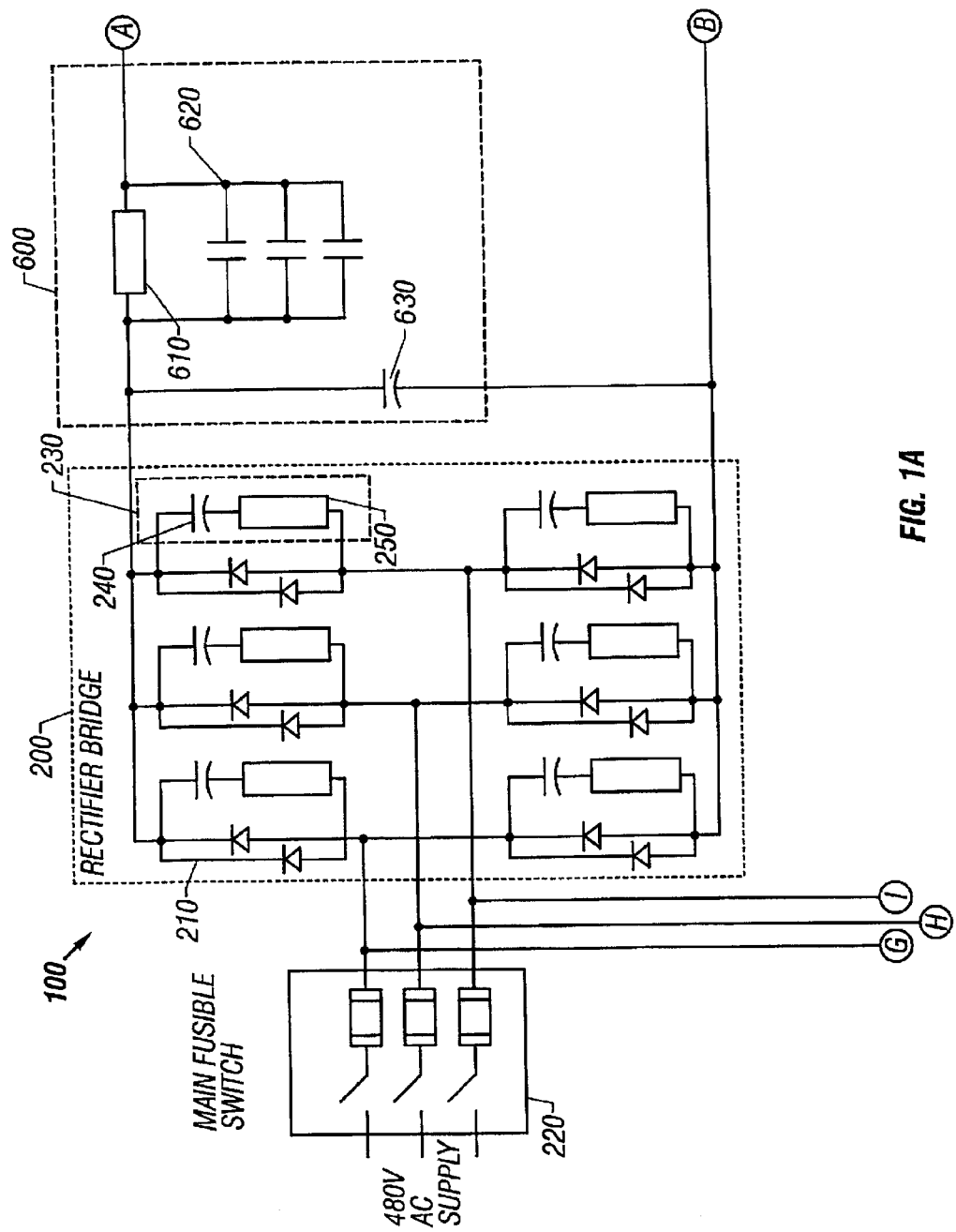
FIG. 1 is a schematic drawing of a zero threshold surge suppressor according to one embodiment of the present invention.
Figure 1B:
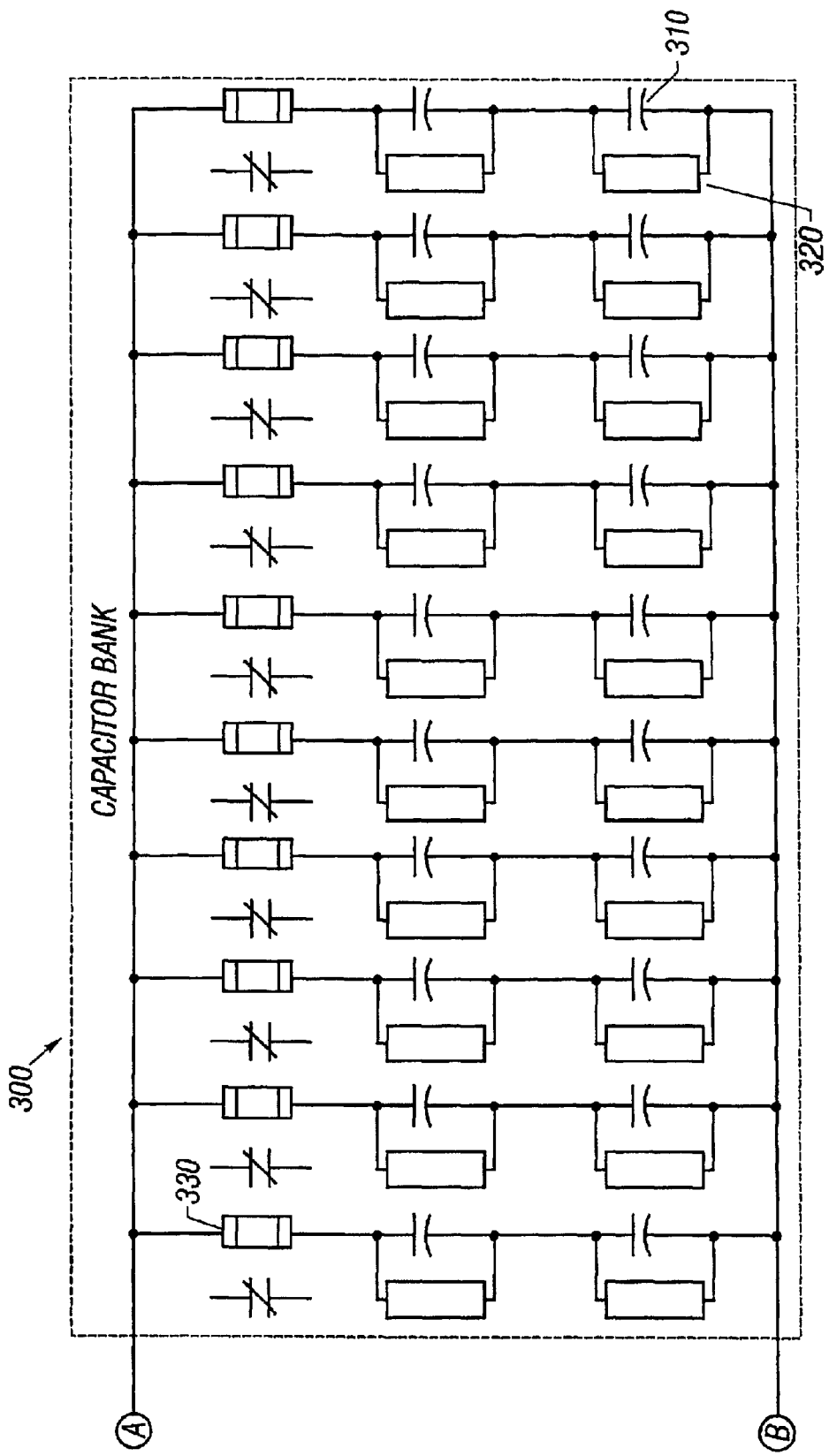
Figure 1C:
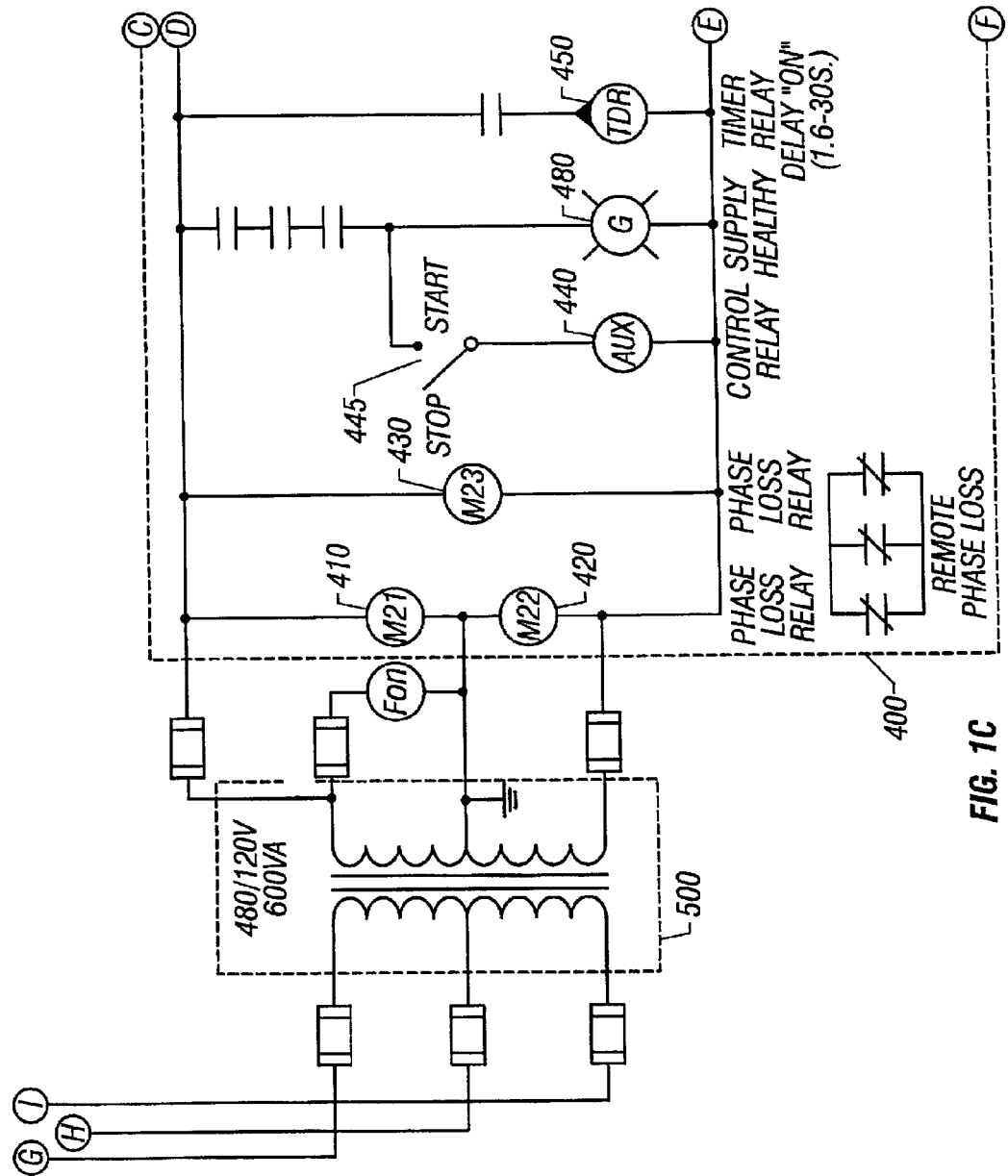
Figure 1D:
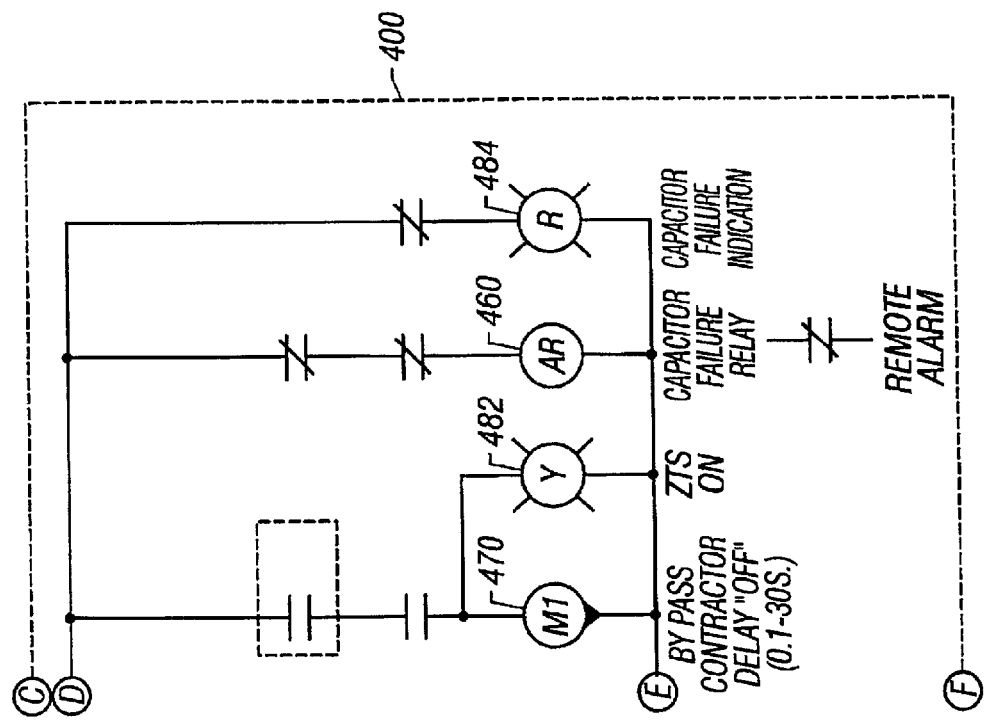

The primary application of the zero threshold surge suppressor is in industrial manufacturing environments where adjustable speed drives are employed in large quantities. The zero threshold surge suppressor is commonly used with a 208, 400, 480 or 600 volt ac supply and is installed as close to the secondary of a substation transformer. The zero threshold surge suppressor utilizes a diode bridge and dc electrolytic capacitor bank to provide a low impedance path for a transient voltage or current to flow and be dissipated. As the transient voltage or current occurs, the dc bus attempts to over charge the dc capacitors and acts to clamp the transient voltage or current to an acceptable level. Actual clamping of the transient depends upon several factors including: 1) the capacitance of the capacitors and time constant of the circuit as a result of the combination of capacitors and resistor elements, 2) the per unit overvoltage of the transient, 3) the duration of the transient, 4) the frequency of the transient, 5) the time lapse between multiple transients, 6) the upstream network impedance and 7) the impedance between the capacitors and the secondary of the transformer to which the capacitors are connected.

FIG. 1 is a schematic diagram of a zero threshold surge suppressor 100 according to one embodiment of the present invention. The suppressor 100 is divided into four main components: a 3-phase diode rectifier bridge 200, a capacitor bank 300, a display and diagnostic center 400 and a precharge section 600.

The diode bridge 200 comprises a plurality of diodes 210 connected to a three-phase ac power supply through a main fusible switch 220. When a transient overvoltage condition occurs, the line side of the diode rectifier bridge 200 detects a higher than normal peak voltage. Typically, the diode rectifier bridge 200 rectifies the input voltage to a dc voltage level. However, when a transient overvoltage condition occurs and the higher than normal peak voltage reaches the diode rectifier bridge 200, the rectifier bridge attempts to increase the level of the dc voltage in response to the new, higher ac peak voltage. The capacitors and resistors of the capacitor bank 300, discussed below, are then charged to this new dc voltage level. Since the entire zero threshold surge suppressor 100 presents a low impedance path to the transient overvoltage, the bulk of the transient energy is shunted into the zero threshold surge suppressor 100 and attempts to charge the capacitors 310 in the capacitor bank 300. As a result, the transient overvoltage peak is absorbed into the zero threshold surge suppressor 100 and the rest of the electrical network does not detect a significant peak overvoltage. After the transient subsides, the capacitors 310 in the capacitor bank 300 discharge through their associated resistors 320 until the normal dc voltage or non-transient operating voltage is again reached.

In addition to the plurality of diodes 210, the diode bridge 200 comprises a snubber circuit 230 to modify a transient voltage or current during switching. The snubber circuit 230 comprises a capacitor 240 and resistor 250 which can be connected in shunt with the switching device 220 to limit the rate of rise of the voltage or the peak voltage across a sensitive load when switching from a conducting state to a blocking state or when the load is subjected to an external transient voltage, such as a lightening strike. Additionally, the capacitor 240 and resistor 250 can also be connected in series with the switching device 220 to limit the rate of rise or fall of current through the device when switching on or off.

The capacitor bank 300 comprises a plurality of dc electrolytic capacitors 310 electrically coupled to the diode bridge 200 and in parallel with a plurality of resistors 320 to provide sufficient impedance to limit a peak transient voltage. Each resistor-capacitor leg contains an overcurrent protective device, such as a dual element time delay fuse 330. Note that the selection of capacitors and resistors creates an resistor-capacitor time constant which has a significant impact on the response characteristics of the suppressor.

In practice, when a utility switches its power factor correction capacitors, the voltage on the line will first fall and then follow by a sudden rise. This process will repeat itself until the system settles down within ½ cycle. The zero threshold surge suppressor can absorb the sudden change of the incoming high-energy by charging and discharging the capacitors. The rate of charge and discharge of the capacitors depends on the time constant of the resistor-capacitor circuit. The property of a capacitor to store an electric charge when its plates are at different potentials is referred to as its capacitance. The capacitance (C) of a capacitor is stated in terms of the amount of charge (Q) stored at a given voltage drop across the capacitor:

Charge=Q=CV (coulombs)

A capacitor does not discharge at a steady rate. Rather, the rate of discharge is rapid at first, but slows considerably as the charge approaches zero. The time constant of the resistor-capacitor leg is defined as the time required for the charge on the capacitor to attain 63.21% of its final value. Therefore, the time constant of the resistor-capacitor circuit and the total value of capacitance are critical design parameters of the zero threshold surge suppressor. The total capacitance of the zero threshold surge suppressor 100 determines the energy dissipation limitations on the device and must be determined based on the actual energy contained in the transient as measured or simulated.

The display and diagnostic center 400, which is electrically coupled to transformer 500, comprises a plurality of phase loss relays 410, 420 and 430, which are connected to phase A–B, B–C and C–A, respectively. Relays 410, 420 and 430 indicate that the supply voltage is within normal tolerance (i.e., a voltage sag or line fault has not occurred upstream of the zero threshold surge suppressor). The contact in relays 410, 420 and 430 are connected in series to the indicator light 480 to indicate that a phase loss condition has not occurred. The contact in relays 410, 420 and 430 are also connected in series with the auxiliary control relay 440 such that a phase loss condition will cause the auxiliary control relay 440 to open. A selector switch 445 is in series with the auxiliary control relay 440 to start and stop the unit and also to reset the unit in the event of a phase loss condition. The auxiliary control relay 440 has a contact connected to main timing relay 450, which ensures that the capacitor bank 300 is precharged through the precharge resistor 610 prior to closing the bypass contactor 470, 620. The bypass contactor coil 470 is controlled by the timing relay 450 and an electrical interlock to the main fusible switch 220. Indicator light 482, preferably illuminating the words "ZTSS ON", is also controlled by the timing relay 450 and the electrical interlock to the main fusible switch 220. Illumination of indicator light 482 indicates that the zero threshold surge suppressor is ready to suppress a transient. A capacitor failure relay 460 is controlled by multiple, series connected normally-closed contacts on the fuses 330 in the capacitor bank 300. If any fuse 330 fails, the capacitor failure replay 460 deenergizes and indicator light 484 will be illuminated thereby indicating a blown fuse condition on one or more of the resistor-capacitor legs of the capacitor bank 300. The zero threshold surge suppressor 100 will continue to operate even with one or more blown fuses 330, but at a somewhat reduced effectiveness since the total capacitance available to suppress a transient has been reduced.

The precharge section 600, comprises a precharge resistor 610 and a bypass contactor 620 controlled from the bypass contactor coil 470. The precharge resistor 610 provides protection against fuse 330 failures when first energizing the zero threshold surge suppressor by limiting the inrush current into the capacitor bank 300 to acceptable levels. After the capacitors 310 in the capacitor bank 300 have partially charged, the bypass contactor 620 later closes to effectively remove the precharge resistor 610 from the circuit. The precharge section 600 also comprises a dc bus smoothing capacitor 630 to smooth out the inherent ripple of the dc bus after rectification by the diode bridge 200.

Figure 2A:
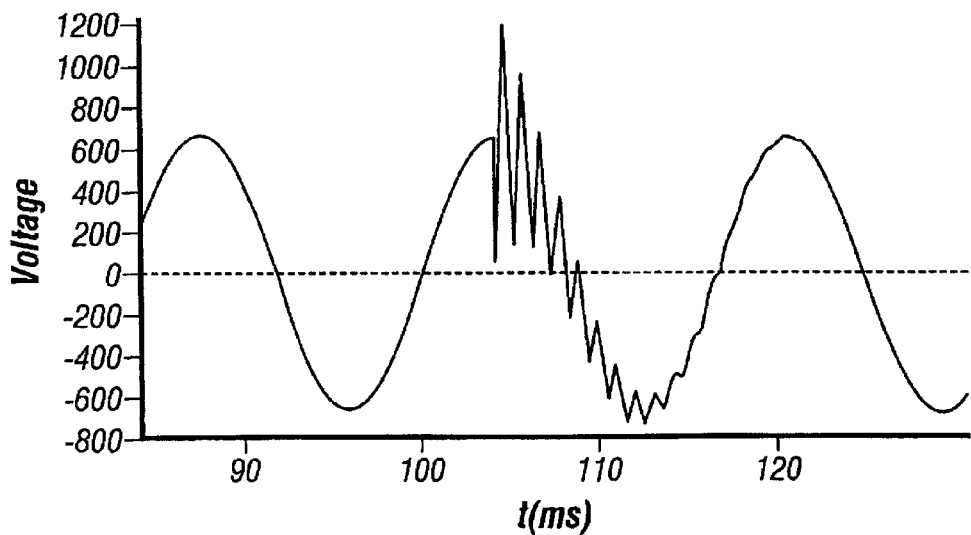
FIG. 2a is a transient voltage waveform across a load in a circuit without a zero threshold surge suppressor.
Figure 2B:
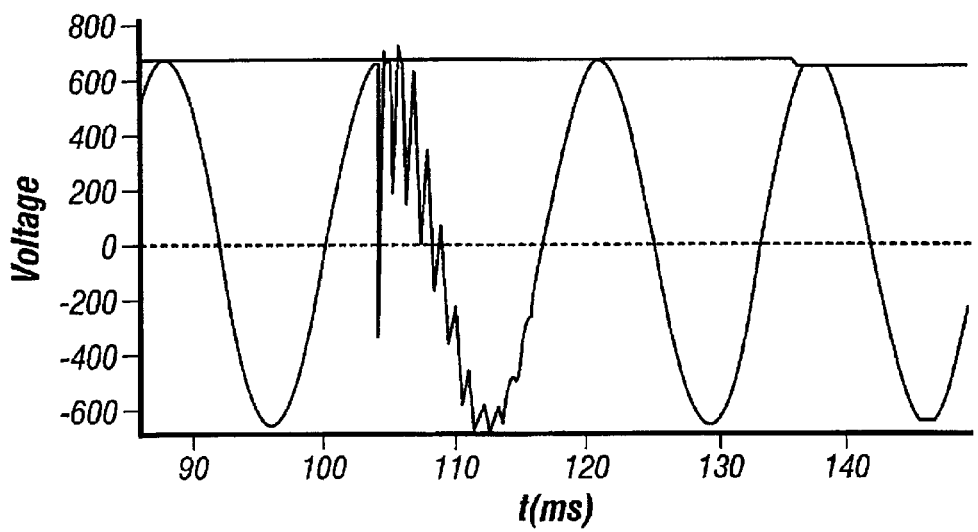
FIG. 2b is a transient voltage waveform across a load in a circuit containing a zero threshold surge suppressor.

FIG. 2a illustrates a transient voltage waveform across a load in a circuit without a zero threshold surge suppressor. The figure illustrates that without the combination diode bridge 200 and capacitor bank 300, a sensitive load is subjected to approximately 200 percent of the peak voltage thereby potentially damaging the load or causing an interruption in the circuit containing the load. FIG. 2b illustrates a transient voltage waveform across a load in a circuit containing a zero threshold surge suppressor wherein the load is subjected to approximately 110 percent of the peak voltage. Therefore, with the inclusion of a zero threshold surge suppressor within a circuit, the transient voltage is suppressed with minimal, if any, effect to the load.

The foregoing description is directed to particular embodiments of the present invention for the purpose of illustration and explanation. It will be apparent, however, to one skilled in the art that many modifications and changes to the embodiment set forth are possible without departing from the scope and the spirit of the invention. It is intended that the following claims be interpreted to embrace all such modifications and changes.

What is claimed is:

1. A surge suppressor to suppress transient energy to a load from an ac power supply, comprising:
   (a) a diode bridge electrically coupled to the ac power supply for supplying electrical power to the load;
   (b) a plurality of capacitor units in a bank electrically coupled to said diode bridge to clamp the transient energy, at least one of said capacitor units having a capacitor combined in parallel with a resistor to discharge the transient energy until a non-transient operating voltage is obtained; and
   (c) a control unit to safely energize the suppressor and monitor operational status of the suppressor.

2. The surge suppressor of claim 1 wherein said diode bridge comprises a capacitor and a resistor connected in shunt with a switching device to limit a rate of voltage increase across said load when switching from a conducting state to a blocking state.

3. The surge suppressor of claim 2 wherein said capacitor and said resistor limit a peak voltage across said load when said load in subjected to the transient energy.

4. The surge suppressor of claim 1 wherein each said combination capacitor unit and parallel resistor contain an overcurrent protective device.

5. The surge suppressor of claim 4 wherein said overcurrent protective device is a normally-closed, dual element time delay fuse.

6. The surge suppressor of claim 5 wherein said control unit comprises a capacitor failure relay controlled by a plurality of said dual element time delay fuse wherein if at least one of said plurality of dual element time delay fuses fails said capacitor failure relay deenergizes and a fuse failure indicating device is energized.

7. The surge suppressor of claim 1 wherein said control unit comprises a plurality of phase loss relays electrically connected to a three-phase ac power supply to indicate that a supply voltage is within a normal tolerance.

8. The surge suppressor of claim 7 wherein said plurality of phase loss relays are connected in series with an auxiliary control relay such that a phase loss condition will cause said auxiliary control relay to open.

9. The surge suppressor of claim 8 wherein said auxiliary control relay has a contact connected to a timing relay which ensures that said plurality of capacitor units in a bank are precharged prior to closing a bypass contactor.

10. The surge suppressor of claim 8 wherein said control unit comprises a reset element in series with said auxiliary control relay to reset the surge suppressor in the event of a phase loss condition.

11. The surge suppressor of claim 10 wherein said reset element is a selector switch.

12. A surge suppressor to suppress transient energy to a load from an ac power supply, comprising:
 (a) a diode bridge electrically coupled to the ac power supply for supplying electrical power to the load;
 (b) a plurality of capacitor units in a bank electrically coupled to said diode bridge to clamp the transient energy;
 (c) a control unit to safely energize the suppressor and monitor operational status of the suppressor;
 (d) a precharge unit electrically coupled to said plurality of capacitor units for limiting an inrush current into said plurality of capacitor units upon initialization of the surge suppressor; and
 (e) an overcurrent protective device for the bank of capacitor units, the overcurrent protective device comprising a normally-closed, dual element time delay fuse.

13. The surge suppressor of claim 12 wherein said diode bridge comprises a capacitor and a resistor connected in shunt with a switching device to limit a rate of voltage increase across said load when switching from a conducting state to a blocking state.

14. The surge suppressor of claim 13 wherein said capacitor and said resistor limit a peak voltage across said load when said load is subjected to the transient energy.

15. The surge suppressor of claim 12 wherein each said capacitor unit is combined with a parallel resistor to discharge the transient energy until a non-transient operating voltage is obtained.

* * * * *